(No Model.) 2 Sheets—Sheet 1.
W. P. PRALL.
HORSE HAY RAKE.
No. 361,645. Patented Apr. 19, 1887.
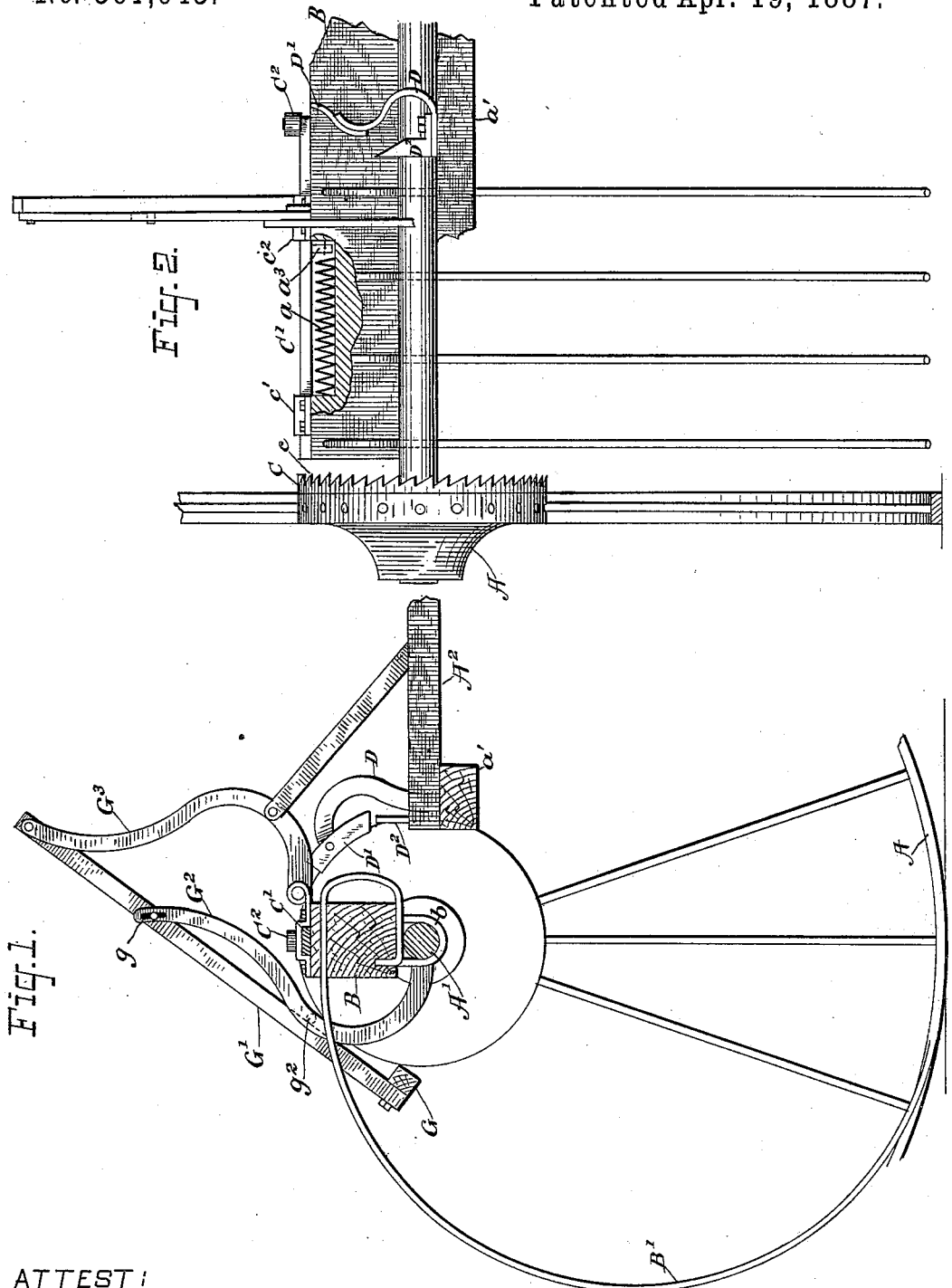
ATTEST:
J. A. Mundle
Julius Rehwoldt.
INVENTOR:
Walter P. Prall,
By Wm. M. Cuthbert,
Attorney (No Model.)  2 Sheets—Sheet 2.

W. P. PRALL.
HORSE HAY RAKE.

No. 361,645.  Patented Apr. 19, 1887.

ATTEST:
J. H. Mundle
Julius Rehwoldt

INVENTOR:
Walter P. Prall
By Wm. M. Cuthbert,
Attorney

UNITED STATES PATENT OFFICE.

WALTER P. PRALL, OF WOODBRIDGE, NEW JERSEY.

HORSE HAY-RAKE.

SPECIFICATION forming part of Letters Patent No. 361,645, dated April 19, 1887.

Application filed March 9, 1886. Serial No. 194,657. (No model.)

*To all whom it may concern:*

Be it known that I, WALTER P. PRALL, residing at Woodbridge, in the county of Middlesex and State of New Jersey, have invented certain new Improvements in Horse Hay-Rakes, of which the following is a specification.

My invention relates to hay-rakes and specifically to the horse hay-rake for which Letters Patent No. 333,084 were granted to me December 22, 1885.

The objects of my invention are to utilize the power of the horse to raise the rake when it is desired to dump the accumulated hay; also to relieve the cleaner from any motion when the rake is in operation. I attain these objects by the mechanism hereinafter described, and illustrated in the accompanying drawings, in which—

Figure 3:
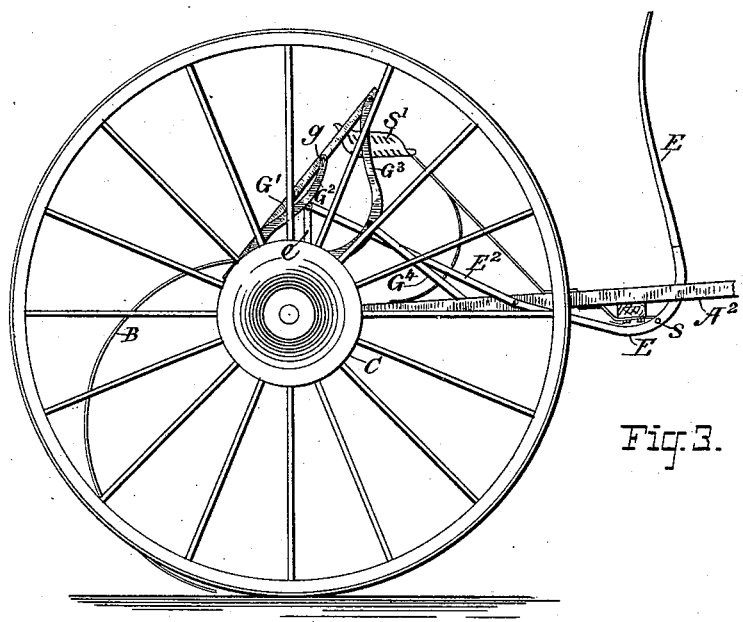
Figure 4:
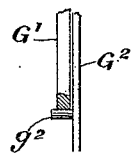

Figure 1 is a vertical cross-section through the rake-head. Fig. 2 is a sectional front elevation of the rake-head. Fig. 3, Sheet 2, is a side elevation of a horse hay-rake provided with my improvement, and shows the hand-lever and rod connecting it to the rake-head. Fig. 4, Sheet 2, is a sectional detail showing one of the carrying-bars, one of the metal supports, and its rest-pin $g^2$, which projects laterally, and on which the carrying-bar rests and moves, the lower end of the bar being removed just at the point where it rests on the pin.

Similar letters of reference refer to like parts in all the figures.

A' is the axle; B, the rake-head, which is placed on top of the axle, to which it is secured by three or more screw-headed staples, $b$, as shown. B' are the rake-teeth. $A^2$ is one of the thills. $a'$ is one of the cross-bars which extend from one thill to the other.

The mechanism for raising the rake consists of a hand-lever, the crown-wheel C, provided with ratchet-teeth $c$, which is securely attached to the hub of one of the traveling wheels A, the periphery of the one being in coincidence with the other, and the ratchet-teeth projecting inwardly and over the axle A', said wheel C being of such diameter that its teeth will revolve in line with the bolt C'. This bolt is located on top of and lengthwise of the rake-head B, to which it is secured by the boxes $c'$ $c^2$, through which it slides longitudinally. Between these boxes and directly underneath the bolt the rake-head is mortised out, so as to provide a seat for the spiral spring $a$, which bears against the wood at the end of its seat toward the traveling wheel A, and the other end bears upon a downward-projecting pin, $a^3$, which is fast in the bolt C', and which, besides acting as a bearing for the spring, acts also as a stop to the bolt and action of the spring, which is to thrust it away from the crown-wheel C.

$C^2$ is a roller mounted on and projecting from the top side or face of the bolt, its pivot or shaft being at right angles thereto, or vertical, and located at the free end of said bolt, as is shown in Fig. 2, the point or outer end of the bolt being even with the end of the rake-head B, directly in front of the roller $C^2$ and the rake-head B.

D is a vertical spring mounted on the cross-bar $a'$. On its upper and free end it carries the cam D', which curves from a point even with the top of the rake-head and inside of the roller C' down and outwardly toward the crown ratchet-wheel C, as shown in Fig. 2. At the same time its face is coincident to the periphery of the crown-wheel C, and its length such that the roller $C^2$ will just clear or have room to pass under its lower end when the rake-teeth are raised to their highest point by the rake-head being turned on the axle A'. Toward the front, just outwardly from the spring D, and the width of the diameter of the roller $C^2$, is a pointed projecting piece, $D^2$, which is mounted on and secured to the base of spring D. (See Fig. 2.)

S' is the driver's seat; E, the hand-lever, having its fulcrum at S, and a connecting-rod, $E^2$, which connects it to the short vertical standard $e$, which is securely bolted to the rake-head B.

The operation of this part of my invention is as follows: When it is desired to raise the rake-teeth from the ground, the hand-lever of the rake-head, which may be as shown or of any other form, arranged to operate or turn the rake-head on its axis, is drawn back toward the seat S', so as to slightly turn the rake-head on the axle. This action brings the roller $C^2$ into contact with the outside of the cam D', which at once moves the bolt C' outwardly, so that its point will enter into and be engaged by some one of the ratchet-teeth $c$ of the crown-wheel C, at which time the rake-teeth will be about eight or ten inches from the ground. As soon as this engagement has taken place the power of the horse comes into action on the rake-head through the medium of the traveling wheel and its ratchet-wheel, which completes the quarter movement of the head on the axle, and so raises the rake-teeth and dumps the hay. Just as this is done the roller $C^2$ comes into contact with the inclined edge of the vertical piece $D^2$, which forces it to the inner side of the cam D′, which, being assisted by the spiral spring $a$, retracts the bolt C′ from its engagement with the ratchet-wheel C, whereupon the weight of the rake-teeth turns the head to the rear, and the teeth are again in a raking position. It will be seen that this part of my invention is very simple in construction and can be readily applied to any horse hay-rake in which the hay is dumped by turning the rake-head on the axle.

G is the cleaner, which extends under the rake-teeth back of and parallel to the head B. G′ are carrying-bars, to which it is connected. They extend upward and over the head B. $G^2$ are moving metal supports, which at their lower ends connect to the axle A′ in such a way that they can turn on it. $G^3$ are curved levers attached by hinge-joints to the front of the rake-head, to the upper ends of which the carrying-bars G′ are connected by pivots, all of these parts being constructed and arranged as is set forth in the Letters Patent granted to me as above mentioned. I have found in practice, however, that the cleaner is constantly, though slightly, in motion when the rake is being operated upon rough ground, by reason of the jarring of the traveling wheels being conveyed to it through the medium of the axle and parts $G^2$. In order to prevent this I provide the parts $G^2$ with slots $g$ at their upper ends. The carrying-bars G′ are connected to $G^2$ by large headed pivots, which pass through the slots $g$ and are screwed fast into the bars, the rest-pins $g^2$ giving support to the bars when the rake is in operation. By this arrangement the slot moves on the pin of the bar without imparting any movement to it.

I claim—

1. In a horse hay-rake, the combination of the traveling wheel A, provided with a crown ratchet-wheel, sliding bolt C′, provided with the stop and bearing-pin $a^3$, spiral spring $a$, roller $C^2$, mounted on the sliding bolt C′, cam D′, and projecting piece $D^2$, the rake-head, and a hand-lever, as and for the first object set forth.

2. In a horse hay-rake, the combination of the swinging supports $G^2$, having the rest-pins $g^2$ and slots $g$, with the arms G′, supporting the cleaner-bar G and provided with bolts passing through slots $g$, and pivoted to the links $G^3$, which have pivotal connections with the rake-head and the frame $A^2$, as and for the purpose set forth.

WALTER P. PRALL.

Witnesses:
DANIEL W. BROWN,
JAMES P. PRALL.